United States Patent [19]

Morton

[11] E Patent Number: Re. 33,414

[45] Reissued Date of Patent: Oct. 30, 1990

[54] ELECTRIC STEAM HUMIDIFIER

[75] Inventor: Bernard W. Morton, Minnetonka, Minn.

[73] Assignee: DRI STEEM Humidifier Company, Hopkins, Minn.

[21] Appl. No.: 298,906

[22] Filed: Jan. 18, 1989

Related U.S. Patent Documents

Reissue of:

[64] Patent No.: 4,239,956
Issued: Dec. 16, 1980
Appl. No.: 929,271
Filed: Jul. 31, 1978

[51] Int. Cl.[5] ..... F24F 6/18

[52] U.S. Cl. ..... 392/386; 126/113; 137/590; 137/590.5; 392/324

[58] Field of Search ..... 219/271, 272, 273, 274, 219/275, 276, 362, 333; 126/113; 261/141, 142; 137/577, 590, 590.5

[56] References Cited

U.S. PATENT DOCUMENTS

| | | | |
|---|---|---|---|
| 48,870 | 7/1865 | Jones | 122/379 |
| 354,710 | 12/1886 | Klose | 122/379 |
| 442,156 | 12/1890 | Warden | 122/379 |
| 783,878 | 2/1905 | Lydon | 137/590 |
| 1,021,597 | 3/1912 | Hankison | 122/379 |
| 2,191,885 | 2/1940 | Hall | 257/215 |
| 2,347,490 | 4/1944 | Legeman | 219/272 |
| 2,365,829 | 12/1944 | Mears | 126/113 |
| 2,577,302 | 12/1951 | Bert | 126/113 |
| 2,883,511 | 4/1959 | Gooldy | 219/272 |
| 3,043,467 | 7/1962 | Schwebel | 122/379 |
| 3,386,659 | 6/1968 | Rea | 239/132 |
| 3,486,697 | 12/1969 | Fraser | 239/136 |
| 3,595,269 | 7/1971 | Yeagle | 137/577 |
| 3,660,635 | 5/1972 | Liebert | 219/273 |
| 3,664,324 | 5/1972 | Radtke | 126/113 |
| 3,716,043 | 2/1973 | Chilcoat | 126/113 |
| 3,718,544 | 2/1973 | Sims | 135/577 |
| 3,774,008 | 11/1973 | Maniscalco | 219/271 |
| 3,835,293 | 9/1974 | McAlister | 219/275 |
| 4,054,122 | 10/1977 | Reed | 126/113 |
| 4,139,762 | 2/1979 | Pohrer | 219/272 |

FOREIGN PATENT DOCUMENTS

| | | | |
|---|---|---|---|
| 133174 | 5/1929 | Switzerland | 137/590 |

OTHER PUBLICATIONS

"Vaporstream Electric Steam Humidifiers", brochure of DRI-STEEM Humidifier Company, publication of the brochure is unknown, but believed subsequent to Jul. 31, 1977.

"Mark 2 Electric Steam Humidifiers", brochure of Vaporstream Humidifier Corporation, publication prior to Jul. 31, 1977.

*Primary Examiner*—Teresa J. Walberg
*Attorney, Agent, or Firm*—Kinney & Lange

[57] ABSTRACT

A humidifier for use with a forced air heating system. The humidifier comprises a water reservoir in the form of a sealed container having a water inlet connection and suitable control means for maintaining the level of the water at a predetermined depth within the reservoir. An electric immersion type heater is also provided within the sealed container at a level which is normally below the water level and, when energized, heats the water to produce steam. The reservoir can be mounted completely external to a duct of the forced air heating system, but an inverted U-shaped tube having preparations along the base thereof is disposed within the duct and has its parallel legs passing through the duct and reservoir so as to communicate with the portion of the reservoir above the level of the water therein. As such, the steam passes through the U-shaped tube and out its perforations to thereby add moisture to the air passing through the duct. A clean-out panel is provided in the reservoir, and because the reservoir itself is disposed external to the duct, the panel may be opened to permit scale and other particulate matter to be removed with little difficulty.

4 Claims, 2 Drawing Sheets

ELECTRIC STEAM HUMIDIFIER

Matter enclosed in heavy brackets [ ] appears in the original patent but forms no part of this reissue specification; matter printed in italics indicates the additions made by reissue.

BACKGROUND OF THE INVENTION

I. Field of the Invention

This invention relates generally to air humidifying apparatus and more specifically to a steam-type humidifier which is extremely flexible in its mounting options, reliable in operation and simple to maintain.

II. Discussion of the Prior Art

It is well known that forced air heating systems tend to create an atmosphere in a building space characterized by low relative humidity which leads to occupant discomfort and possible health problems, damage to wooden articles including furniture contained within the building and the discomfort caused by static electricity discharges. To obviate these problems, it is common practice to employ devices for adding moisture (humidity) to the air being forced through the building space. In this regard, a wide variety of devices are commonly employed. For example, evaporative type systems are installed in the furnace plenum or heating ducts in such a fashion that the heated air is forced to flow through and about sponge-like members which are maintained in a moist condition by means of a suitable water reservoir in which a portion of the evaporator sponge member is in contact. Still other units are known which inject a spray of fine water droplets into the moving air stream by means of a motor driven impeller. In this regard references made to the Hall U.S. Pat. No. 2,191,885 and the Chilcoat U.S. Pat. No. 3,716,043 for devices representative of the above described prior art humidifying techniques and devices.

It is also known in the art to utilize a steam generator in combination with the duct work of a forced air heating system for injecting water vapor into the heated air stream. Typical of this latter approach is the apparatus disclosed in the Rea U.S. Pat. No. 3,386,659 and the Fraser U.S. Pat. No. 3,486,697.

The evaporator type humidifier units suffer from a number of disadvantages including the limited amount of moisture which can be introduced into the air stream by a unit of practical size and the propensity of the evaporator plates or sponges to become incrusted with mineral deposits requiring frequent and somewhat messy cleaning operations and deliming with chemicals.

The prior art steam generator type humidifiers known to me also have a number of drawbacks including the lack of flexibility in the location where the unit may be mounted relative to the heating system, lack of control over the amount of moisture to be introduced and difficulty in cleaning and maintaining the unit in a peak operating mode.

SUMMARY OF THE INVENTION

In accordance with the teachings of the present invention, I provide a steam-type humidifier unit which obviates most of the foregoing problems attendant in prior art humidifiers of the similar type. In its simplest form, the invention comprises a generally sealed enclosure into which water may be introduced to a controlled depth. Located below the water level in the reservoir is an electric emersion-tupe heater. On demand for increased humidity, the water in the reservoir is heated until steam is produced which fills the reservoir in the area above the water level. Communicating with this area of the reservoir and the building's heating duct is a perforated U-shaped tube through which the stream may pass so as to be introduced into the moving air stream. A controlled bleed-off device is included in the reservoir along with an automatic water control valve which limits the mineral concentration which would otherwise build up in the reservoir by draining down the surface water where the mineral scum tends to accumulate. Furthermore, in the present invention, the low water cut-off and water make-up valve control is located outside of the aforementioned reservoir such that liming and scaling of the float mechanism utilized is obviated. Similarly, the make-up water valve, itself, which is a solenoid-operated valve specifically developed to meet the operating conditions encountered in water feeding service is mounted outside of the reservoir and acts to discharge cold water into the reservoir above the water line. Thus, the valve is never exposed to liming action of the heat or hot water.

Still another feature of the present invention is the inclusion of a conveniently located clean-out opening which is readily accessible to maintenance personnel whereby settled mineral scale can be readily removed by flushing or scraping.

Furthermore, the unit of the present invention is readily adaptable to mounting in a plurality of possible locations. For example, it can be conveniently mounted on the underside of a heating duct; it may be inserted directly the duct; it may be placed in the blower compartment of the heating system; or with the use of a steam host kit, the unit may be mounted somewhat remote from the duct or ducts into which the moisture is to be introduced. Along these lines, it is not necessary to utilize steam piping with a remote boiler as is required by known prior art devices such as exemplified by the aforementioned Rea Patent.

OBJECTS

It is accordingly a principle object of the present invention to provide a new and improved steam-type humidifier unit for use with a forced air heating system.

Another object of the invention is to provide a steam-type humidifier device which remains operational over extended period with a minimum of maintenance and upkeep.

Still another object of the invention is to provide a steam-type humidifier unit which is versatile in its adaptation to existing forced air heating systems.

A still further object of the invention is to provide an improved steam-type humidifier unit whose various controls are disposed outside of the water reservoir so as to be relatively free from contamination.

Yet another object of the invention is to provide, in a steam-type humidifier, an arrangement whereby periodic maintenance can be conveniently accomplished.

A yet still further object of the invention is to provide a steam-type humidifier which may be located outside of the normal forced air heating system duct but which includes a generally U-shaped tube which communicates with the steam chamber for permitting the introduction of steam vapor into the air flow.

These and other objects and advantages of the invention will become apparent to those skilled in the art from the following detailed description of the preferred embodiment when considered in connection with the accompanying drawings in which like numerals in the several views refer to corresponding parts.

Figure 1:
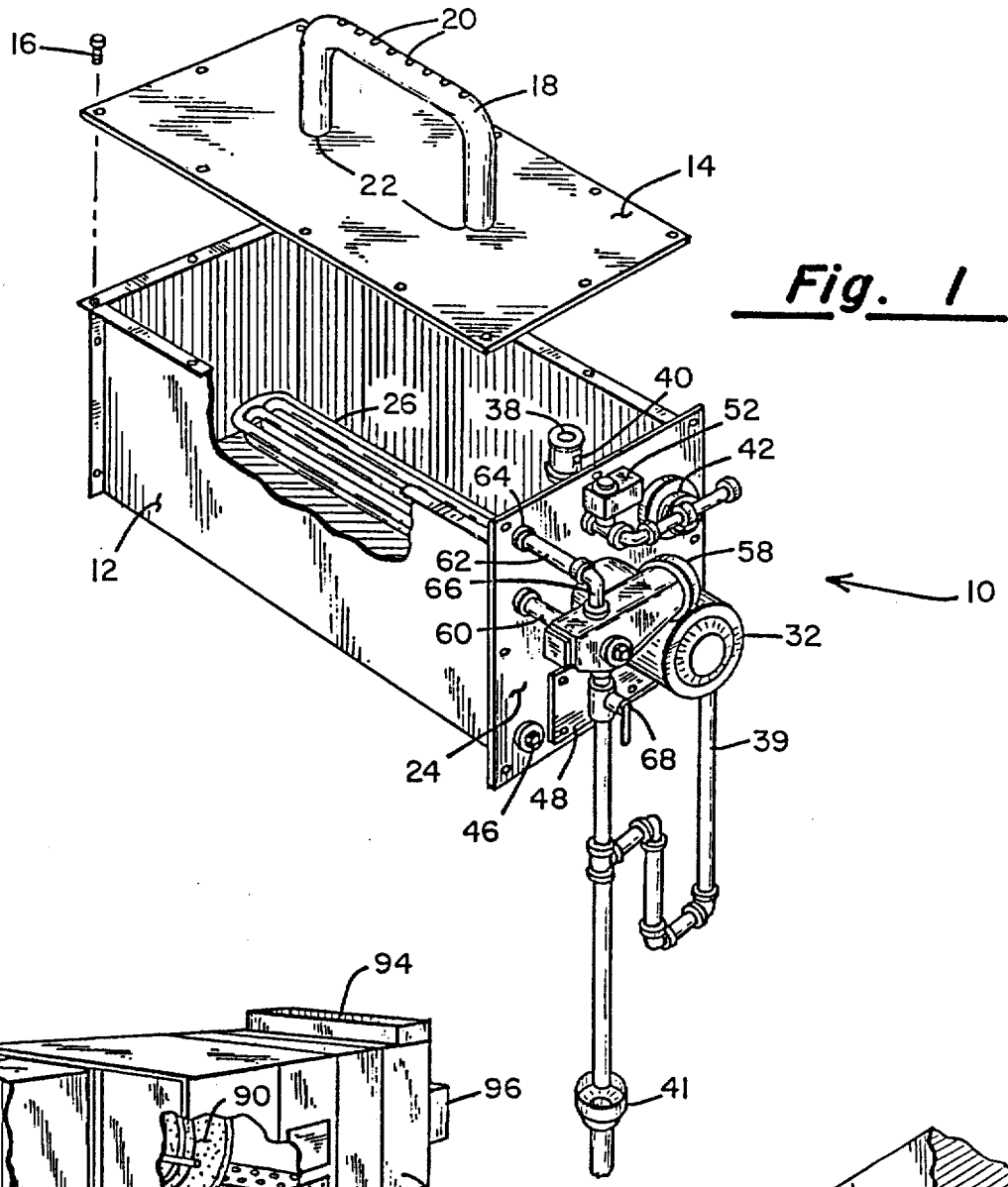
FIG. 1 is a perspective view of the preferred embodiment with its cover plate removed to expose various parts.

Referring first to FIG. 1, there is indicated generally by numeral 10 a steam-type humidifier made in accordance with the present invention. It can be seen that there is provided a generally rectangular boxlike container or reservoir 12 which is preferably formed from stainless steel and which is adapted to be sealed by a cover plate 14 as by sheet metal screws 16. Disposed on the upper surface of the cover plate 14 is a generally U-shaped tube member 18 having a plurality of perforations 20 in the inverted base portion thereof, the legs of the tubing passing through circular apertures 22 formed through the cover plate 14. *The legs of the U-shaped tube member are spaced apart and generally coextensive in length.*

Numeral 24 identifies the face plate of the humidifier unit 10 and mounted on this face plate are a plurality of controls and other devices, the purpose of each which will be more fully set forth herein below as the Description of the Preferred Embodiment proceeds.

Figure 2:
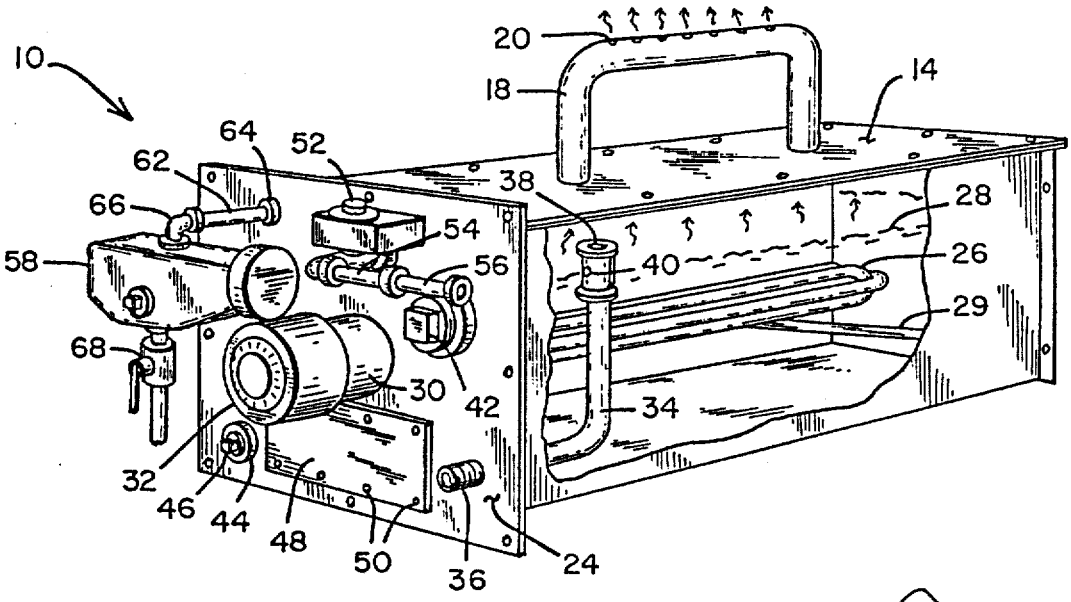
FIG. 2 is a perspective view of the unit taken from a different angle.

Referring next to the perspective drawing of FIG. 2 which shows the unit with a side wall removed for clarity, disposed within the enclosure or reservoir 12 is an immersion type electrical heating element 26 which is oriented in a generally horizontal extending direction below the normal level of the surface of the water, which surface is identified by numeral 28. The heating unit 26 is preferably a model 71420-XX manufactured by the Indeeco Company of St. Louis, Missouri which unit produces approximately 40 watts of power per square inch when energized from a 120 volt 60 Hz supply.

One end of the heater unit 26 is supported by a bracket 28 so as to relieve the stress at the coupling point. The heater unit 26 is adapted to be connected to the face plate 24 by a threaded coupling 30. The necessary wiring for the heater unit is contained within the outlet box 32 which is secured to the threaded coupling 30 in a conventional fashion.

Also contained within the chamber 12 is a stand-pipe member 34 which is a tube having a right angle bend therein a portion of the tube extending through the face plate 24 at 36, this portion being threaded so that suitable plumbing can be attached thereto as at 38 to provide an exit to a sewer drain 40, all as illustrated in FIG. 1. The vertical portion of the stand-pipe 34 is opened at its top end to allow water to drain into it in case of a malfunction of the water make-up valve, all as will be more particularly described herein below.

Located a predetermined distance below the open end 38 of the stand-pipe 34 is an aperture 40 which is generally at an elevation determining the water level within the reservoir. When the water level reaches the top of the aperture 40, the water make-up valve (yet to be described) closes and stops the flow of water into the reservoir. The water then drains through the stand-pipe 34 and through the plumbing 38 into the sewer drain 40 until the water level is even with the bottom of the aperture 40. When the heater element is energized and steam is being produced, the water level drops a predetermined distance below the bottom of the aperture 40, at which time a water make-up valve opens to introduce additional water into the reservoir, again raising the water level to the top of the aperture 40 and the cycle is repeated.

Should the water level drop below a predetermined elevation due to any possible malfunction of the water control valve, a low water control cut-off relay comes into play to deenergize the heating element. Thus, the heating element 26 is always submerged within the water contained within the reservoir.

Disposed in the face plate 24 is a further aperture which is in an opposed relationship to the aperture 40 formed in the stand-pipe 34. This aperture is normally sealed by a threaded plug 42 which, when removed, allows visual inspection without having to disconnect any piping or writing. This opening also provides an access simplifying the cleanout of the drain-down hole 40 when needed.

A similar hole is provided through the face plate 24 at its lower left hand corner and is identified by numeral 44. This hold is provided with a threaded plug 46 and when removed, allows all of the water contained within the reservoir to be drained out. This may be done prior to cleaning.

Numeral 48 identifies a plate which normally seals a cleanout opening formed in the bottom of the face plate. By removing the screws 50, the plate 48 may be removed to expose the opening and allow access of a scraping tool or brush to facilitate removal of sediment and scale. A gasket member (not shown) is sandwiched between the face plate 24 and the cleanout cover 48 to provide a water-tight seal.

The make-up water valve is identified by numeral 52 and is a solenoid operated valve which is mounted outside of the reservoir and allows the discharge of cold water into the reservoir above the normal water line. As such, this valve is not exposed to liming action of the heat or hot water. The valve 52 may be a type 8262C-2Z manufactured by Automatic Switch Company of Florham, New Jersey. The cold water inlet to the valve 52 is made by way of the pipe 54 (FIG. 2) and a strainer unit 56 disposed in the water line to remove sediment.

In order to control the opening and closing of the make-up valve 52 and to control the low water cut-off of the heating unit 26, a float-operated controller, indicated generally by numeral 58 is provided. This control mechanism is located outside of the hot water compartment to prevent liming and scaling of the float mechanism. A connection 60 between an aperture formed in the face plate 24 and the control 58 determines the level at which the heater cut out relay contained within the control 58 will become operative to disconnect the heater unit from the A.C. supply.

A connection is also established between the top of the valve 58 and the inside of the reservoire 12 at a point above the water line 28. More specifically, and with reference to FIG. 1, a tube 62 having a fitting 64 connected to the face plate 24 and an elbow 66 connecting the tube 62 to the low water cut-off and make-up valve controller 58 is a vent connection between the top of the float chamber in the controller 58 and the humidifier which equalizes the duct static pressure within the float chamber thus preventing a false water line indication to the control unit.

Exiting from the underside of the control unit 58 is a manually operable drain valve 68 which allows the float chamber therein to be drained periodically as a way of flushing out the float chamber preventing the buildup of particulate therein which might otherwise cause malfunctioning of the control unit 58.

A control unit found highly suitable for the instant application is the type 80 controller manufactured by the McDonnell and Miller Company, a division of the ITT Corp., having a place of business in Chicago, Illinois.

Now that the details of the construction of the steam-type humidifier of the present invention have been described in detail, a consideration will next be given to the manner in which the unit may be mounted in a forced air heating system. In this connection, reference will be made to the FIGS. 3–6 of the application.

Figure 3:
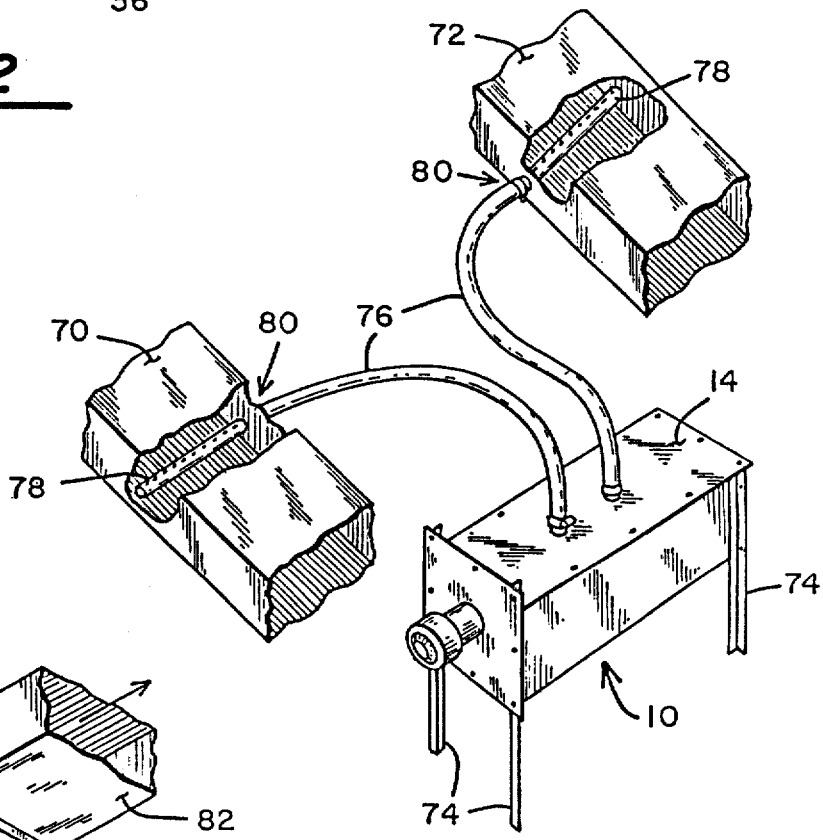
FIG. 3 illustrates a first mounting arrangement of the preferred embodiment when in a free-standing mode.

Referring to FIG. 3, there are shown first and second heating ducts 70 and 72 with the humidifier unit 10 supported remote therefrom on $1 \times 1 \times \frac{1}{4}$ inch angle iron support legs 74. Instead of employing the U-shaped tube 18 as a steam dispenser. hoses 76 are connected to the outlet of the humidifier unit on the cover plate 14, these hoses connecting to stainless steel dispersion tubes 78 disposed within the ducts 70 and 72. If desired, a calibrated orfice 80 may be provided at the connection between the hoses 76 and the dispersion tubes 78 so that proper proportioning of steam into the various ducts can be achieved.

Figure 4:
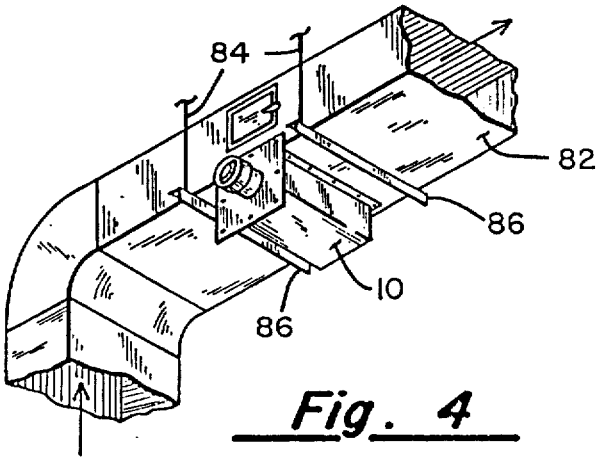
FIG. 4 is an alternative mounting arrangement on the underside of a heating duct.

Next, with reference to FIG. 4, the manner in which the humidifier unit may be mounted on the underside of a forced air heating duct is illustrated. Here, a rectangular opening is cut in the bottom of the existing duct 82 and the humidifier unit 10 is fastened directly thereto by sheet metal screws with the U-shaped dispenser tube 18 extending into the duct. In order to support the additional weight of the humidifier unit, it may be desirable to provide support rods as at 84 between the ceiling of the building and transversely extending support brackets 86. Using this approach, it is possible to maintain the humidifier unit in a generally horizontal orientation which is, of course, desirable for proper operation thereof. Again, it may also be desirable to install a suitable rubber gasket (not shown) between the mating surfaces of the horizontally extending flange on the humidifier unit 10 and the underside of the heating duct. This will prevent the escape of steam at this juncture.

Figure 5:
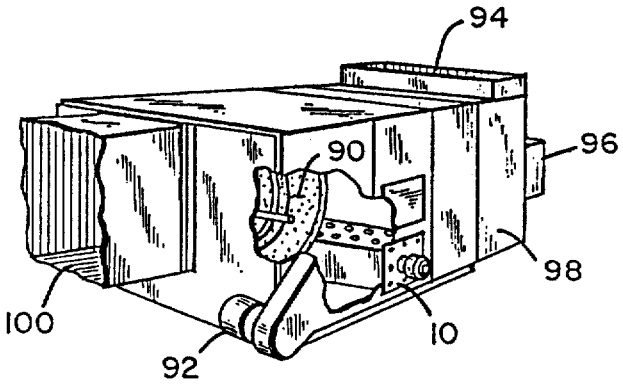
FIG. 5 is a view showing a still further mode of mounting the invention.

The steam humidifier of the present invention may also be installed in the blower compartment of the forced air heating system. This arrangement is illustrated in FIG. 5 of the drawings. Here the humidifier unit 10 is disposed directly on the floor of the blower compartment and during installation is properly shimmed to insure a level orientation. Instead of utilizing the U-shaped perforated dispenser tube 18 of FIG. 1, the cover plate 14 is provided with a plurality of apertures through which the steam generated may escape. A squirrel-cage blower fan 90 driven by a suitable fan motor 92 draws outdoor and return air into the air handling unit by way of the ports 94 and 96 and through a suitable filter unit 98 where it then passes over the humidifier unit 10, picking up moisture therefrom and delivering it through the supply air duct 100. Because the face plate 24 of the humidifier unit 10 is exterior to the blower compartment the various access ports are accessible to permit cleaning and maintenance.

Figure 6:
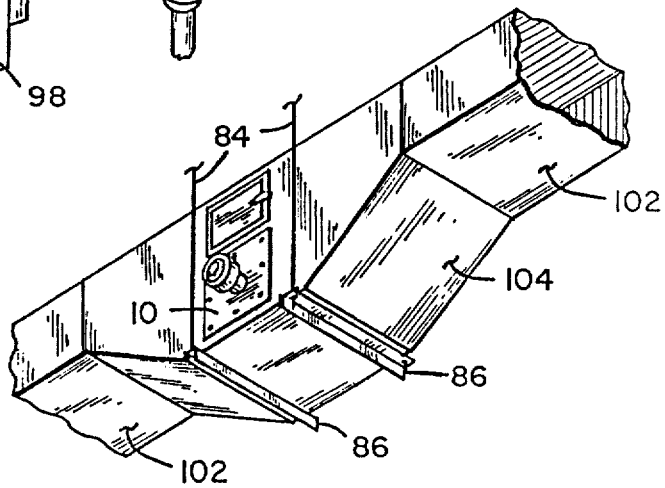
FIG. 6 is a view still a further alternative for mounting the invention with respect to the heating duct.

With reference to FIG. 6, the manner in which the humidifier unit 10 of the present invention may be mounted interior to a warm air duct in a forced air heating system is illustrated. Here, the duct 102 is provided a trapezoidal duct enlargement section 104 into which the humidifier unit 10 is disposed with its face plate 24 located outside of the duct enlargement. As with the mounting arrangement of FIG. 4, it may be desirable to provide support rods 84 and angle brackets 86 which are connected to the structural members of the building in order to support the weight of the unit and to maintain it in its desired level relationship.

While the mode of operation of the invention is deemed to be obvious from the foregoing description of the apparatus, brief mention will be made at this point to the various features thereof.

Once the unit is mounted in any of the various configurations illustrated in FIGS. 3–6 of the drawings, and the plumbing and electrical connections are established, water is allowed to flow from the cold water supply through the strainer unit 56 and pipe 54 into the chamber 12 when the make-up water valve 52 is open. As the water rises in the reservoir it will reach a level corresponding to the top of the aperture 40 formed in the standpipe 34 at which point the control unit 58 senses this condition and closes the solenoid operated make-up water valve 52. Once this valve 52 is closed, the water will drain down to a level corresponding to the bottom of the aperture 40. Because the scum and other particulate matter contained in the water tends to float on the surface thereof, this drain-down action following entry of the make-up water served to skim off this material allowing it to pass through the plumbing 38 to the sewer drain 40.

Once the low water cut-off valve 58 senses that the water level is above the level of the immersion heater 26, the unit 58 operates a suitable switch for connecting power to the heater element 26. The heater element elevates the temperature of the water within the reservoir 12 to the point at which steam is given off. The steam fills the chamber above the water level and exits through the apertures 22 and the U-shaped dispersion tube 18 and out the apertures 20 formed therein. The dispersion tube is disposed within the airstream of the forced air heating system and therefore serves to introduce the desired moisture into this airstream. As the water in the resevoir is converted to steam, which steam is allowed to escape, the water level within the reservoir will continue to drop. When the level drops to a predetermined point by evaporation, the control unit 58 senses this condition and opens the valve 52 to permit make-up water to again enter the unit. The water then rises to the point at which the control unit 58 closes the valve 52 and again, the surface of the water in the reservoir drops to a level of the bottom of the aperture 40 in the standpipe 34. This cycle is continuously repeated. However, should the water level drop below a second predetermined level which could happen should the make-up water valve malfunction or the supply of water to the building be interrupted, the control unit 58 will sense this condition and operate a float-controlled switch to disconnect the heater unit from its A.C. supply. This protects the heater unit from developing an excessive temperature and is a significant safety measure.

In addition to the electrical controls heretofore described, in certain installations it may be desirable to also include conventional humidistats for controlling energization of the unit as a function of relative humidity in the space being heated as well as a conventional sail switch which insures that the blower unit is running before the heater element of the humidifier will be energized. Those skilled in the art will know how to connect these last mentioned controlled devices to the humidifier unit to insure proper operation and, therefore, there is no need to describe a further description of such auxiliary controls external to the humidifier unit itself.

Some changes may be made in the construction and arrangement of my improved steam-type humidifier unit without departing from the real spirit and purpose of my invention, and it is my invention to cover by my claims any modified forms of structure or use of mechanical equivalents which may be reasonably included within their scope.

What is claimed is:

1. A humidifier unit for use with a forced air heating system comprising:

(a) a rectangular container having a face plate on one end thereof and a removable top plate member having vapor outlet means therein;

(b) electrically operated valve means attached to said face plate for controlling the flow of water into said container;

(c) an immersible heater element having a first portion thereof disposed in said container at a predetermined elevation and a second portion extending through and attached to said face plate;

(d) a float operated control device affixed to said face plate and electrically connected to said valve means and to said heater element for opening said valve when the depth of water in said container falls below a first level and for closing said valve when the depth of water in said container reaches a second predetermined level, said control device opening the circuit to said heater element when the depth of the water in said container falls a predetermined distance below said first level;

(e) a drain tube member having an open upper end mounted within said container and having the other end thereof extending outwardly therefrom, said drain tube having an aperture formed through the side wall thereof a predetermined distance below the upper open end thereof, the top of the aperature in said drain tube corresponding to said second predetermined level and the bottom of said aperature corresponding to [said] *a* third predetermined level *between the first and second levels; and*

*(f) the vapor outlet means comprising a perforated steam discharge tube having a pair of substantially coextensive, spaced tubular leg sections extending upwardly above the removable top plate member and connected to the top plate member and opening to said container through apertures in the top plate member, and having a second tube section connected to and extending laterally between the two tubular leg sections and projecting into an air stream, said second tube section having outlet openings for discharge of steam therefrom into such air stream remote from the container.*

[2. Apparatus as in claim 1 and further including a removable access plate located proximate the lower edge of said container face plate for normally sealing an access port in said face plate.]

3. Apparatus as in claim 1 and further including an opening formed through said face plate at a location generally aligned with said aperture in said drain tube and plug means for normally sealing said opening.

4. Apparatus as in claim 1 wherein said electrical heater element, when energized, creates steam within said container above said second predetermined level and beneath said top plate member, the steam flowing through said vapor outlet means.

5. Apparatus as in claim 4 and further including means for attaching said humidifier unit to an air duct of a forced air heating system with said vapor outlet means communicating with said duct and at least said face plate external to said duct.

* * * * *

UNITED STATES PATENT AND TRADEMARK OFFICE

CERTIFICATE OF CORRECTION

PATENT NO. : RE 33,414

DATED : October 30, 1990

INVENTOR(S) : Bernard W. Morton

It is certified that error appears in the above-identified patent and that said Letters Patent is hereby corrected as shown below:

Column 2, line 33,

INSERT --into-- after "directly"

Column 2, line 48,

INSERT --an-- after "over"

Column 4, line 26,

DELETE "writing" and insert therefor --wiring--

Column 4, line 31,

DELETE "hold" and insert therefor --hole--

Column 4, line 65,

DELETE "reservoire" and insert therefor --reservoir--

Column 5, line 28,

DELETE "." and insert therefor --,--

Column 5, line 45,

DELETE "support" and insert therefor --angle--

Signed and Sealed this

Twenty-second Day of September, 1992

*Attest:*

DOUGLAS B. COMER

*Attesting Officer*

*Acting Commissioner of Patents and Trademarks*